United States Patent [19]
Foss, Jr. et al.

[11] Patent Number: 6,006,522
[45] Date of Patent: Dec. 28, 1999

[54] TRANSLATIONAL ACTUATOR

[75] Inventors: Richard L. Foss, Jr.; Wayne A. Siebrecht, both of Golden, Colo.

[73] Assignee: Lockheed Martin Corporation, Bethesda, Md.

[21] Appl. No.: 09/131,723

[22] Filed: Aug. 10, 1998

[51] Int. Cl.[6] .................................................. F01B 29/10
[52] U.S. Cl. .............................................. 60/528; 60/527
[58] Field of Search .............................. 60/527, 528, 529

[56] References Cited

U.S. PATENT DOCUMENTS

| | | | |
|---|---|---|---|
| 3,291,474 | 12/1966 | Clarke | 267/1 |
| 3,316,415 | 4/1967 | Taylor | 290/1 |
| 3,450,372 | 6/1969 | Lange et al. | 244/1 |
| 3,684,994 | 8/1972 | Tyler | 337/140 |
| 3,720,107 | 3/1973 | Shepard | 73/363.7 |
| 4,010,455 | 3/1977 | Stange | 340/224 |
| 4,055,955 | 11/1977 | Johnson | 60/527 |
| 4,086,769 | 5/1978 | Smith | 60/527 |
| 4,150,544 | 4/1979 | Pachter | 60/527 |
| 4,761,955 | 8/1988 | Bloch | 60/528 |
| 4,772,807 | 9/1988 | Bouvot | 307/119 |
| 4,887,430 | 12/1989 | Kroll et al. | 60/527 |
| 4,965,545 | 10/1990 | Johnson | 60/527 X |
| 4,996,842 | 3/1991 | Goldstein | 60/527 |
| 5,086,618 | 2/1992 | Tanaka | 60/527 |
| 5,127,228 | 7/1992 | Swenson | 60/527 |
| 5,396,769 | 3/1995 | Brudnicki | 60/528 |
| 5,447,125 | 9/1995 | McNally et al. | 122/17 |

*Primary Examiner*—Hoang Nguyen
*Attorney, Agent, or Firm*—Holmes Roberts & Owen LLP

[57] ABSTRACT

An actuator for at least translationally or linearly moving an object from a first position to a second position displaced from the first position is disclosed. In one embodiment, the actuator includes a strip of shape memory alloy configured as a coil wound about a first rotatably-fixed member, the strip having first and second end portions, the first end portion being interconnectable to the first rotatably-fixed member and the second end portion being operatively associated and/or interconnectable with the object to be moved, and a heating assembly adapted to heat at least a portion of the strip of shape memory alloy from a first temperature corresponding to the strip being in a martensitic state to a second temperature corresponding to the strip being in an austenitic state, the second temperature being above a martensitic/austenitic transformation temperature of the shape memory alloy. Such heating of the strip to the austenitic state results in at least radially-outward and arcuate movement of the second end portion of the strip which, in turn, may move the object translationally.

18 Claims, 8 Drawing Sheets

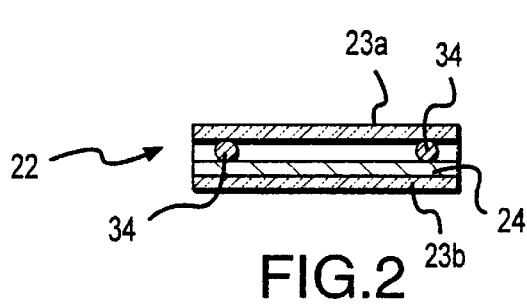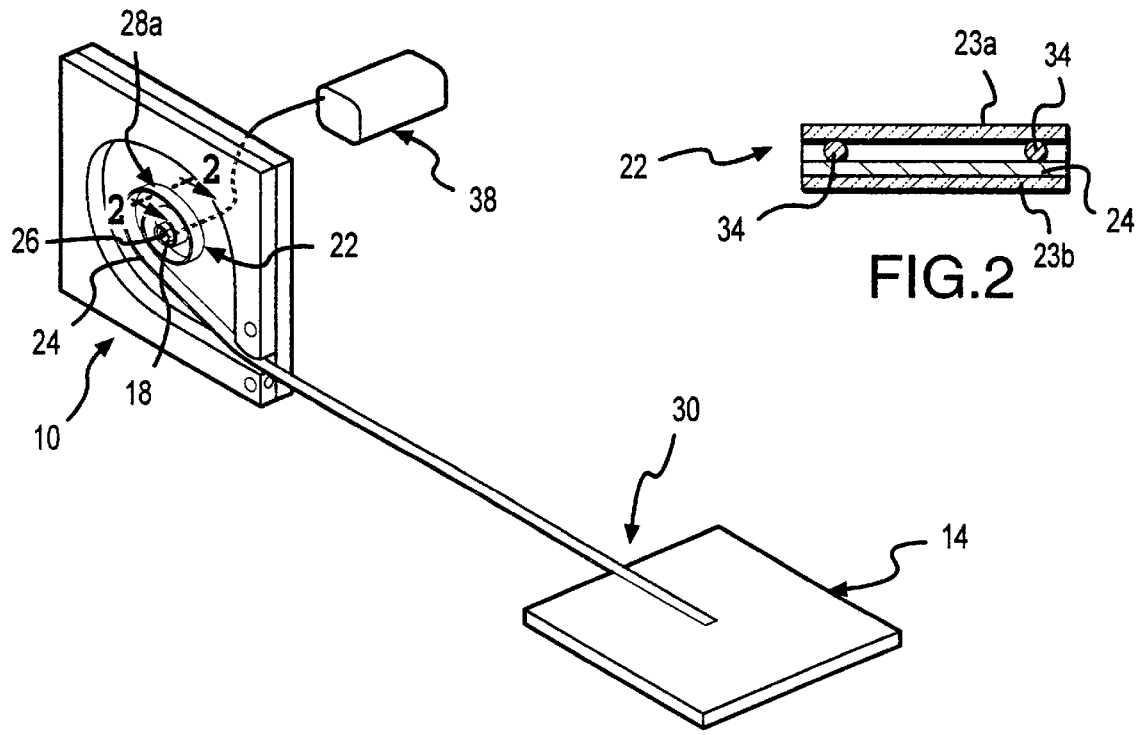
FIG.2
FIG.1A
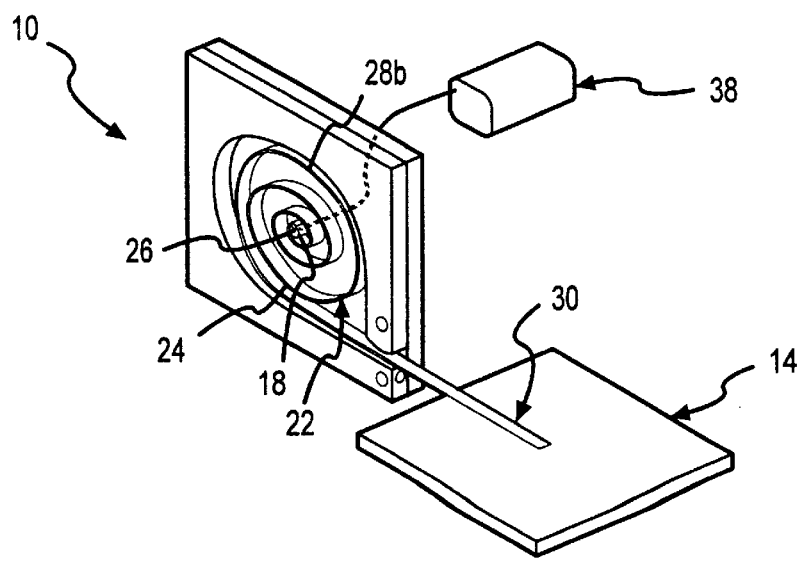
FIG.1B

TRANSLATIONAL ACTUATOR

FIELD OF THE INVENTION

The present invention generally relates to actuators for moving an object from a first location to a second location, and in particular, relates to a heat controlled actuator for at least linearly or translationally moving an object from a first location to a second location.

BACKGROUND OF THE INVENTION

Various techniques have been used to move objects from one location to another location. In order to move an object in certain environments (e.g., space), where the object itself or a payload carried by the object is relatively delicate, irreplaceable or extremely valuable, such movement should be accomplished with minimal vibration or shock to reduce the likelihood of damage to the object or payload carried by the object.

The design of such actuators that are capable of reliably retracting an object or payload from one position to another position presents a number of challenges. For example, the actuator should be capable of applying the necessary energy to physically move the object or payload. Further, the actuator should move the object or payload with a minimal amount of shock or vibration to reduce the risk of damage to the object or payload. Additionally, because the actuator may be used in an extraterrestrial environment (e.g., on orbit around the Earth, on the moon, or on another planet, such as Mars), the actuator should be lightweight, have a minimal number of parts to reduce maintenance requirements, exhibit improved reliability, have a compact arrangement to reduce the size for storage (e.g., during launch), and have a low fabrication cost to reduce the overall cost of the spacecraft.

SUMMARY OF THE INVENTION

Accordingly, it is an object of the present invention to provide a mechanism for moving an object from one location to another location.

It is a further object of the present invention to provide an actuator which is capable of moving an object from a first position to at least a second position with a minimal amount of shock to or preloading of the object to minimize the likelihood of damage to the object or payload to be moved by the actuator.

It is another object of the present invention to provide an actuator suitable for use in extraterrestrial environments.

The present invention achieves one or more of these objectives by providing an actuator which utilizes a shape memory alloy. Generally, the actuator of the present invention may include a coil comprising a strip wound about a first rotatably-fixed member and a means, operatively associated with the coil, for actuating the coil to at least translationally or linearly move a first object from a first position to a second position. Specifically, in one embodiment, the coil comprises a single strip comprising a shape memory alloy or other similar metal(s), whereby a first end portion of the strip is interconnectable to the first rotatably-fixed member, and a second end portion of the strip is interconnectable and/or operatively associated with the object to be moved. Such shape memory alloy of the coil may be in a martensitic state when the first object is in the first position, and may be in an austenitic state when the first object at least moves toward the second position. In this regard, the means for actuating the coil may comprise a means for heating the strip from a first temperature corresponding to the coil in a martensitic state to a second temperature corresponding to the coil in an austenitic state, the second temperature being above the martensitic/austenitic transition temperature of the shape memory alloy. The means for heating may comprise a heating assembly which is capable of conductively, radiatively and/or convectively heating the strip of shape memory alloy to a temperature above the martensitic/austenitic transition temperature of the shape memory alloy. In one embodiment, the means for heating comprises a heater including a flexible heating element engagable with the single strip of shape memory alloy and an electric source in electrical communication with the flexible heating element, the flexible heating element being resistively heatable upon application of an electric current from the electric source to the flexible heating element. In this embodiment, the strip of shape memory alloy is heatable from the first temperature to the second temperature by conductive heat transfer of heat from the flexible heating element to the strip of shape memory alloy as the heating element is resistively heated.

Specifically, upon heating of the shape memory alloy strip to a temperature above the martensitic/austenitic transition temperature, the radius of the coil increases without substantially changing the length of the strip, which, in turn, causes the first object associated with the second end portion of the strip to move from the first position to the second position. In addition, heating of the strip comprising a shape memory alloy to a temperature above the martensitic/austenitic transition temperature results in arcuate movement of the second end portion of the strip from a first arcuate position to a second arcuate position different from the first arcuate position. In particular, a first radius of the coil corresponding to the coil in the martensitic state may be defined by a first radial distance between the second end portion of the strip and the first rotatably-fixed member, the second end portion being located at the first arcuate position. Further, a second radius of the coil corresponding to the coil in the austenitic state may be defined by a second radial distance between the second end portion of the strip and the first rotatably-fixed member, the second end portion being located at the second arcuate position. In this regard, heating of the strip comprising a shape memory alloy results in radially-outward and arcuate movement of the second end portion of the strip. Such expansive movement of the coil may be directly or indirectly used to move at least the first object from the first position to the second position translationally (e.g., linearly) displaced from the first position.

In another embodiment, the actuator for moving an object or payload from a first location to a second location includes a first rotatably-fixed shaft, a coil comprising a strip of shape memory alloy wound about the first rotatably-fixed shaft, a means, associated with both the first object to be moved and a second end portion of the strip, for translating at least arcuate movement of the second end portion of the strip into at least linear movement of the first object from the first position, and a means, operatively engagable with the coil, for at least arcuately moving the second end portion of the strip from a first arcuate position to at least a second arcuate position relative to a first end portion of the strip to move at least the first object from the first position to at least a second position. Specifically, the means for at least arcuately moving the second end portion of the strip from a first arcuate position to a second arcuate position may include a means for transitioning the coil from a martensitic state to an austenitic state. In one embodiment, the means for transitioning includes a heating assembly which is capable of heating (e.g., conductively, radiatively and/or convectively)

at least a portion of the coil from a first temperature to a second temperature, the first temperature being below the martensitic/austenitic transition temperature of the shape memory alloy and the second temperature being above the martensitic/austenitic transition temperature of the shape memory alloy. In this regard, the heating assembly may comprise a heating element contactable with at least a surface of the strip of shape memory alloy and a electric source for supplying current to the heating element to resistively heat the heating element, which in turn, conductively transfers heat to the strip of shape memory alloy.

In the martensitic state, a first intermediate portion of the coil has a first radius of curvature. In the austenitic state, the first intermediate portion of the coil has a second radius of curvature greater than the first radius of curvature. In this regard, heating of the coil to a temperature above the martensitic/austenitic transition temperature may not only move the second end portion of the strip from the first arcuate position to the second arcuate position, but also may expand the coil into a less coiled (e.g., less curved, more flattened) configuration. As such, the means for at least arcuately moving is capable of moving the second end portion of the strip of shape memory alloy radially outwardly and arcuately relative to the first rotatably-fixed shaft. Such radially outward and arcuate movement of the second end portion of the strip relative to the first rotatably-fixed shaft may be utilized to translate at least the first object from the first position to at least the second position via the means for translating at least arcuate movement of the second end portion of the strip into at least linear movement.

The means for translating may comprise a translational member which is capable of translating rotational or arcuate movement of at least the second end portion of the strip comprising shape memory alloy into linear movement. The translational member may be interconnectable to and/or rotatable relative to the first rotatably-fixed shaft, such that the translational member is rotatable about the same or a common axis as the second end portion of the strip of shape memory alloy. At least a first portion of the translational member may be engagable with the second end portion of the strip, such that the first portion of the translational member is rotatable with the second end portion of the strip as the second end portion of the strip moves radially outwardly and arcuately when heated to a temperature above the martensitic/austenitic transition temperature. In one embodiment, the first portion of the translational member is a radially oriented slot which is adapted to receive at least a first end portion of a pin or work bar, the second end portion of which is interconnectable with the second end portion of the strip. The translational member may further include a tether member interconnectable to the first object to be moved. The function of the tether member is to move the first object linearly as the translational member is moved rotationally by the second end portion of the work bar interconnected to the second end portion of the strip as the second end portion of the strip moves radially outwardly and arcuately relative to the first rotationally-fixed shaft (e.g., when the coil is heated to a temperature above the martensitic/austenitic transition temperature to transition the coil from the martensitic state to the austenitic state).

In another embodiment, the actuator may further include a control system for controlling the degree of actuation (e.g., expansion of the coil) by controlling or regulating heating of the strip of shape memory alloy, to thereby control the rate and/or degree of actuation/expansion of the coil and/or to move the object to at least third location, different than the first and second locations (e.g., between the first and second locations). In this regard, the control system may comprise a closed loop control system capable of regulating the amount of and/or rate of current supplied to the heating element.

Of importance, since the coil of the actuator of the present invention applies a force to move the first object only upon application of heat to the coil comprising a shape memory alloy, the actuator of the present invention allows for a discrete application of force without subjecting the object or payload to the full constant tension or loading (e.g., preload) prior to the load application event. As such, long term reliability and survivability of the actuator of the present invention are enhanced. In addition, the actuator of the present invention is well-suited for use in extraterrestrial environments since the actuator uses a minimal number of parts and is lightweight, relatively cost-effective and compact.

For purposes of achieving repeatability for resetting the actuator of the present invention, such that the actuator may undergo a plurality of cycles (e.g., during ground testing if the actuator is to be used in space environments), the shape memory alloy of the actuator's coil may be conditioned. One process embodiment for conditioning the shape memory alloy includes the selection of a shape memory alloy as may be appropriate for a given application, cold-working such shape memory alloy to a predetermined percentage (e.g., to between about 20% and about 45%), and deforming the cold-worked shape memory alloy to "set" a deformation shape. As will be appreciated, fabrication of the shape memory alloy into a desired configuration (e.g., an actuator mechanism, such as the hinge of the present invention) may be totally or partially completed at this point and/or may be carried out later in the process. The process may further include annealing the cold-worked, deformed shape memory alloy by heating the shape memory alloy to a predetermined annealing temperature (e.g., between about 400° C. and about 500° C., and most preferably about 450° C. for TiNi-containing alloys) for a predetermined period of time to reduce the cold-working to between about 3% and about 8%.

The conditioning process further comprises the conditioning steps of: i) heating the shape memory alloy to a predetermined temperature T that is greater than the finish temperature $A_f$ at which martensitic-austenitic transformation is complete for the selected shape memory alloy yet less than the maximum temperature ($M_d$) at which an austenitic-martensitic phase transformation will be induced by force application/release (e.g., thereby causing the shape memory alloy to revert to its predeformation shape) and ii) applying and releasing a strain and/or stress and/or torsional force to pseudoelastically deflect the shape memory alloy in a manner that minimizes the force application used to initially deform or set the deformation shape, while maintaining the shape memory alloy at the elevated temperature T. Preferably, a substantially constant elevated temperature T (e.g., ±10° C.) should be utilized to provide for isothermal conditioning. The force applied during conditioning should be sufficient to induce an austenitic-martensitic phase transformation. Further, force application/release may be advantageously repeated a predetermined number of cycle times (e.g., preferably at least about 50 cycles, and most preferably about 300 cycles) while maintaining the shape memory alloy at the elevated temperature T. Upon satisfaction of the cyclic criteria for a given shape memory alloy, the conditioned shape memory alloy may then be integrated into the intended application mechanism, and subsequently tested to establish particular performance characteristics. In this regard, the conditioning process of the illustrated embodiment yields a shape memory alloy that is particularly apt for use in high precision actuators, including actuators for use in spacecraft, aircraft and underwater applications where reliable performance is at a premium.

DESCRIPTION OF THE DRAWINGS

FIGS. 1A–1B illustrate one embodiment of the actuator of the present invention, in unactuated and actuated states, respectively;

FIG. 2 is a cross-sectional view of the coil of the actuator illustrated in FIG. 1A, taken along line 2—2;

DETAILED DESCRIPTION

Figure 3A:
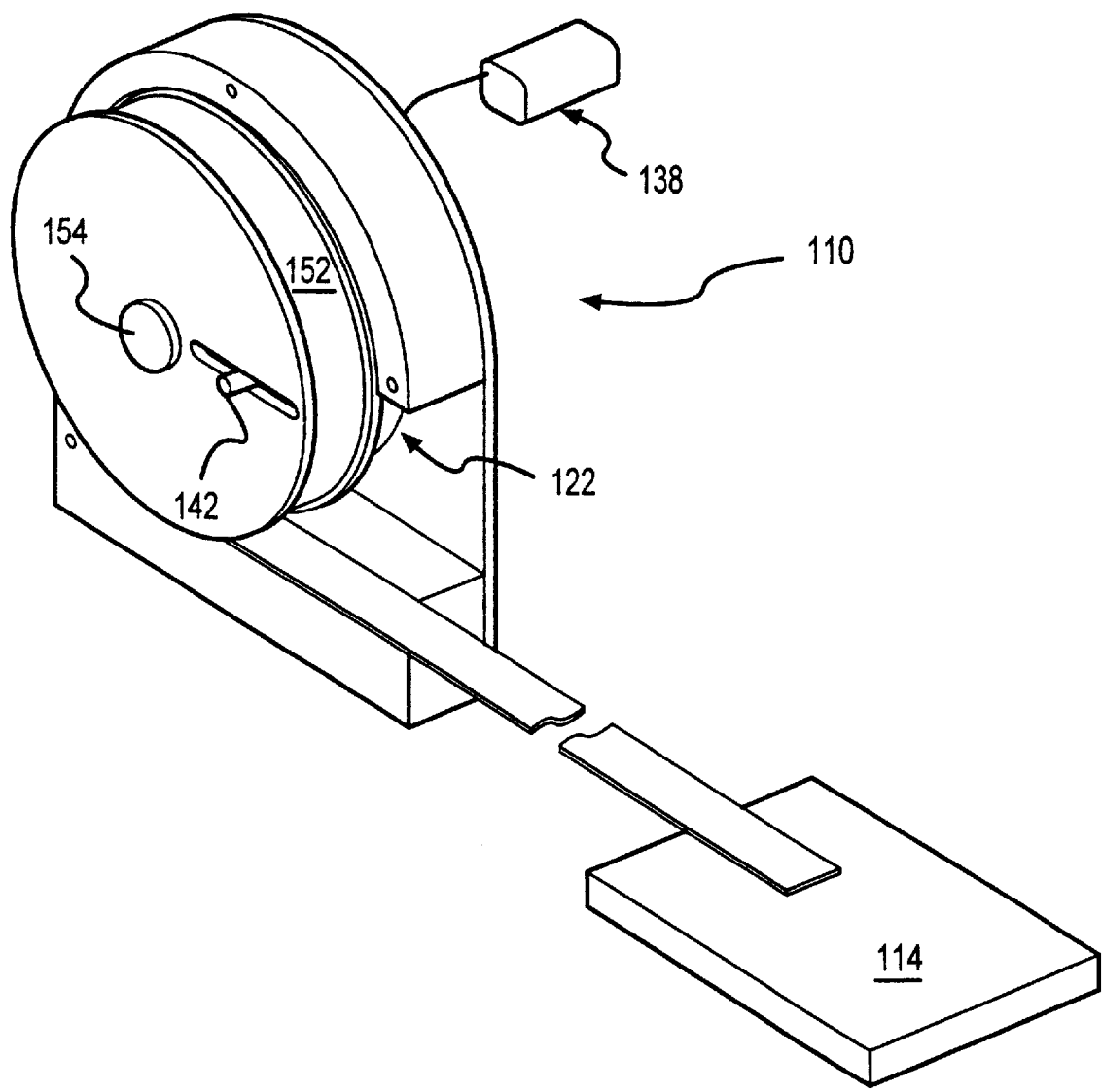
FIGS. 3A–3B illustrate another embodiment of the actuator of the present invention, in unactuated and actuated states, respectively.
Figure 3B:
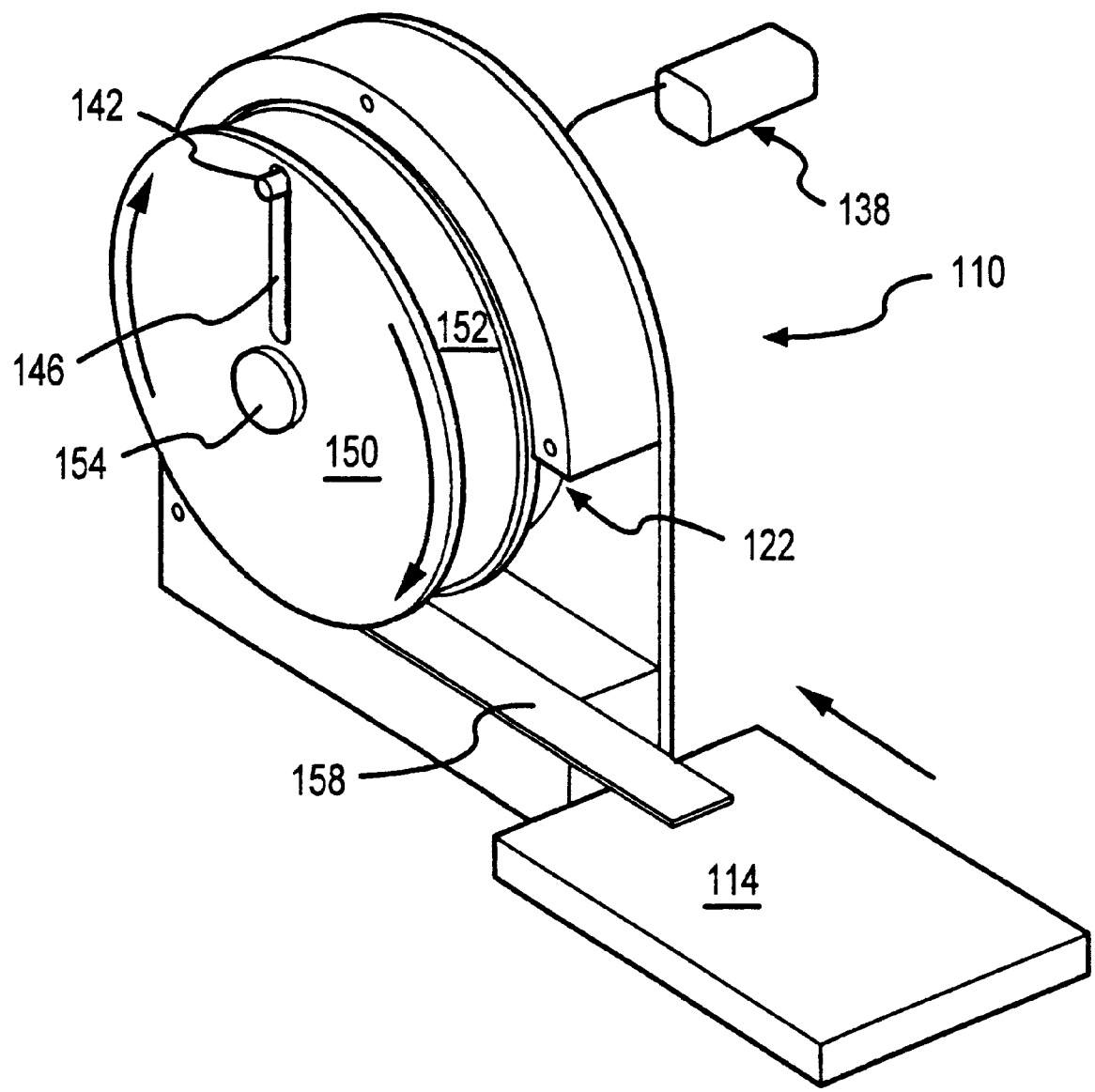
Figure 4:
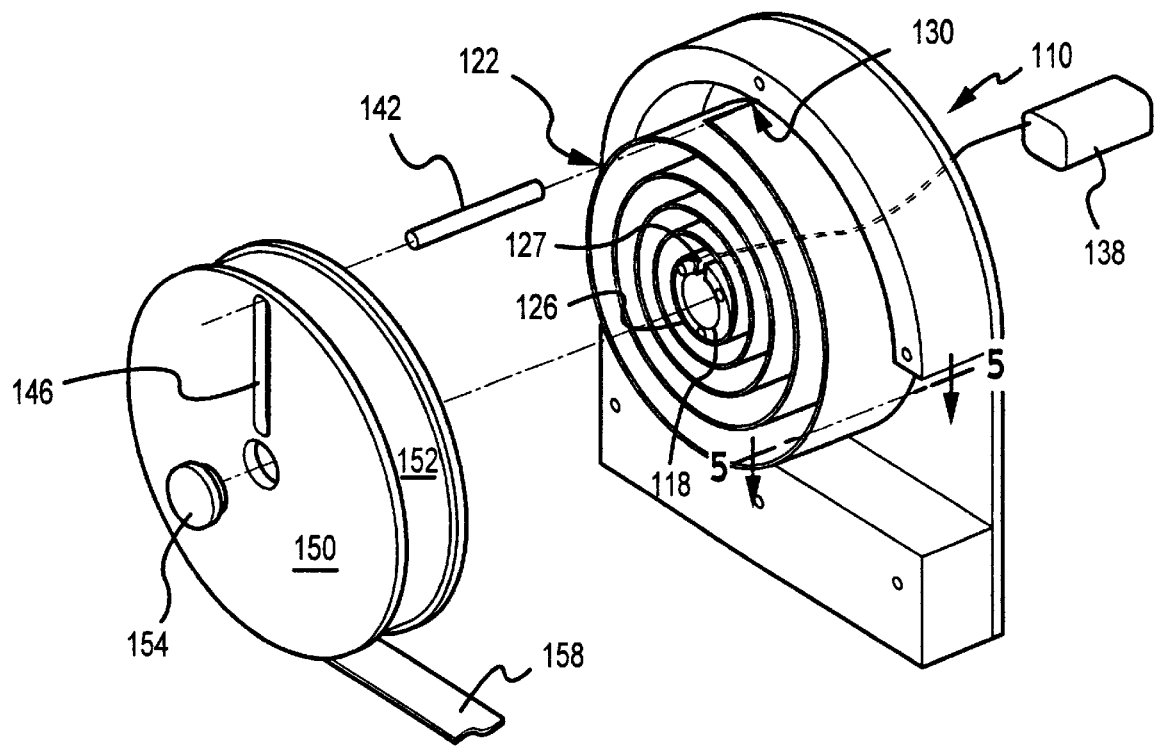
FIG. 4 is a partially exploded view of the actuator illustrated in FIGS. 3A–3B.
Figure 5:
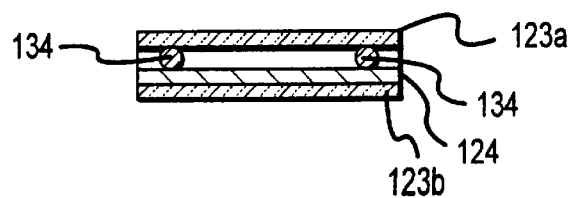
FIG. 5 is a cross-sectional view of the coil of the actuator illustrated in FIG. 3A, taken along line 5—5.
Figure 6:
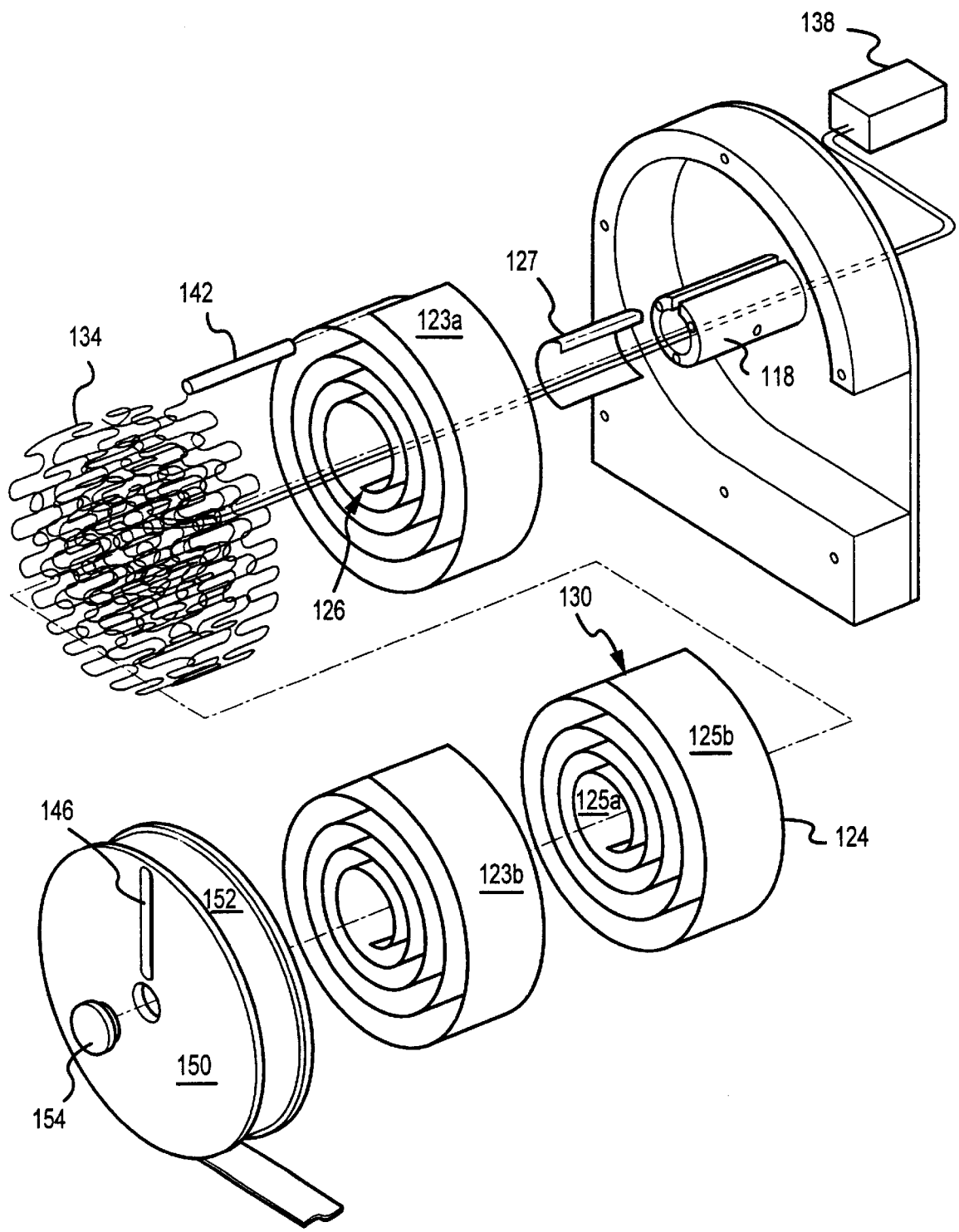
FIG. 6 is an exploded view of the actuator illustrated in FIG. 3A.

FIGS. 1–9 illustrate the various features and characteristics of the actuator of the present invention. Referring to FIGS. 1A–1B, in one embodiment, the actuator 10 for at least linearly moving a first object 14 from a first location (FIG. 1A) to a second location (FIG. 1B) includes a rotatably-fixed member 18, such as a shaft, and a coil 22, a first end portion 26 of which is interconnected to the rotatably-fixed member 18, and a second end portion 30 of which is interconnected to the first object 14. Specifically, the coil 22 includes a single, unitary strip 24 comprising a shape memory alloy (e.g., nickel titanium, nickel titanium copper, etc.). In a first state, illustrated in FIG. 1A, the strip 24 is tightly wound about the rotatably-fixed member 18. In this regard, the strip 24 comprising shape memory alloy may be trained to be in a tightly wound configuration in its martensitic state (e.g., at a first temperature, such as an ambient temperature). Correspondingly, the strip 24 of shape memory alloy may be trained to have an expanded configuration, illustrated in FIG. 1B, when heated to a temperature above the martensitic/austenitic transition temperature, such that in its austenitic state the coil 22 has a less coiled (e.g., less curved, increased radius of curvature) configuration or shape. In this expanded, less coiled configuration corresponding to the austenitic state, the radius of curvature of an intermediate portion 28b is greater than the intermediate portion 28a of the coil in the martensitic state, and the second end portion 30 has moved to a different position relative to the rotatably-fixed member 18. Training of the coil 22 to expand from a coiled configuration illustrated in FIG. 1A to the less coiled configuration illustrated in FIG. 1B may be accomplished by various known techniques for training shape memory alloys.

For purposes of transitioning the strip 24 of shape memory alloy from the martensitic state corresponding to the coil in a somewhat tightly coiled or wound configuration to the austenitic state corresponding to the coil 22 in an expanded coiled configuration, the actuator 10 further includes a heating element 34, illustrated in FIG. 2, and an electric source 38 which is in electrical communication with the heating element 34 to resistively heat the heating element 34 which, in turn, increases the temperature of the strip 24 from a first temperature (e.g., ambient) corresponding to the martensitic state of the strip 24 to a second temperature corresponding to the austenitic state of the strip 24. In particular, and referring to FIGS. 1A–1B and 2, the heating element 34 is appliable (e.g., in abutting engagement) directly to the strip 24 of shape memory alloy such that upon application of an electric current by the electric source 38 to the hearing element 34, the heating element 34 conductively transfers heat to the shape memory alloy strip 24 to increase the temperature of the strip 24 to a temperature above the martensitic/austenitic transition temperature. In one embodiment, the heating element 34 is a thin-diameter wire configured in a zig-zag pattern, which provides sufficient coverage to heat the strip 24 while providing flexibility since the heating element 34 must be bendable. In this embodiment, the heating element 34 is fabricated from Chromega, which is commercially available from Omega Technologies. For purposes of enhancing the heating of the strip 24, the coil 22 further includes insulation layers 23a, 23b fabricated from a flexible insulating material such as polyimide film tape, which is commercially available from DuPont as Kapton.

In another embodiment, illustrated in FIGS. 3A–3B and 4–6, the actuator 110 includes a rotatably-fixed member 118 which is interconnected to a coil 122, which comprises a single, unitary strip 124 of shape memory alloy. More specifically, a first end portion 126 of the coil 122 is interconnected to the rotatably-fixed member 118 and the second end portion 130 of the coil 122 is operatively interfaced with the object 114 to be moved. For purposes of allowing the strip 124 to be tightly wound about the rotatably-fixed member 118, which enhances the resulting stroke, and to allow the strip 124 to fully expand when the temperature of the strip is raised to a temperature above the martensitic/austenitic transition temperature, the first end portion 126 of the coil 122 is interconnected to the rotatably-fixed member 118 via a flexible member 127 which is capable of being bent into a tight radius about the rotatably-fixed member 118. In one embodiment, the flexible member 127 is fabricated from a non-conductive high temperature film (e.g., poly-paraphenylene), such as Kevlar, which is commercially available from Dupont. Alternative materials suitable for use in the flexible member 127 also include any similar flexible, high temperature, high tensile strength material (e.g., flexible carbon fiber).

The second end portion 130 of the coil 122 is interconnectable to a work bar 142, which is operatively interfacable with a radially extending slot 146 of a reel drum 150 which is rotatably interconnected to the rotatably-fixed member 118 via a bearing 154. In this regard, as the coil 122 is heated to a temperature above the martensitic/austenitic transition temperature, the second end portion 130 of the coil 122 moves radially outwardly relative to the rotatably-fixed member 118 and arcuately about the rotatably-fixed member 118 from a first arcuate position to at least a second arcuate position, to thereby rotate the reel drum 150 therewith. In order to translate such rotational movement into linear movement of the first object 114, a tether member 158 is interconnectable or bondable to the outer surface 152 of the reel drum 150. The tether member 158 is preferably a high strength, flexible material, such as poly (ether ketone) (PEEK), which is commercially available from West Lake Plastics.

For purposes of efficiently increasing the temperature of the strip 124 of the coil 122 from a first temperature (e.g., ambient) to a second temperature above the martensitic/austenitic transition temperature of the shape memory alloy of the strip 124, the actuator 110 further includes a heating element 134 which is in abutting contact with (e.g., bondable to) a surface (e.g., inner surface 125a and/or outer surface 125b) of the shape memory alloy strip 124. In this embodiment, the heating element 134 is capable of being resistively heated upon application of an electric current from an electric source 138 in electrical communication therewith. In a preferred embodiment, the heating element 134 is bonded directly to the inner surface 125a of the shape memory alloy strip 124, and is flexible to facilitate bending with the strip 124 of shape memory alloy. An insulation material layers 123a and 123b may be further included over the inner and outer surfaces 125a, 125b of the shape memory alloy strip 124 and the heating element 134 to enhance the heat transfer rate, to thus increase the rate at which the strip 124 of shape memory alloy is heated from a first temperature (e.g., ambient) to a second temperature, above the martensitic/austenitic transition temperature of the shape memory alloy to expand the coil 122. A suitable insulation material attachable to the inner and/or outer surfaces 125a, 125b of the coil 122 is a high temperature thin film thermal plastic, such as Kapton, which is commercially available from 3M.

In one embodiment, the heating element 134 is in abutting engagement or contact with the inner surface 125a of the coil 122. The heating element 134 includes a thin diameter wire arranged in a zig-zag pattern, which provides flexibility to facilitate bending of the heating element 134 with the coil 122. In one embodiment, the heating element 134 comprises a Chromega wire having a diameter of 0.010 inches, which produces 0.5 watts/inch$^2$ when heated by an electric source 138 in electrical connection with the first end portion 126 of the coil 122.

Figure 7:
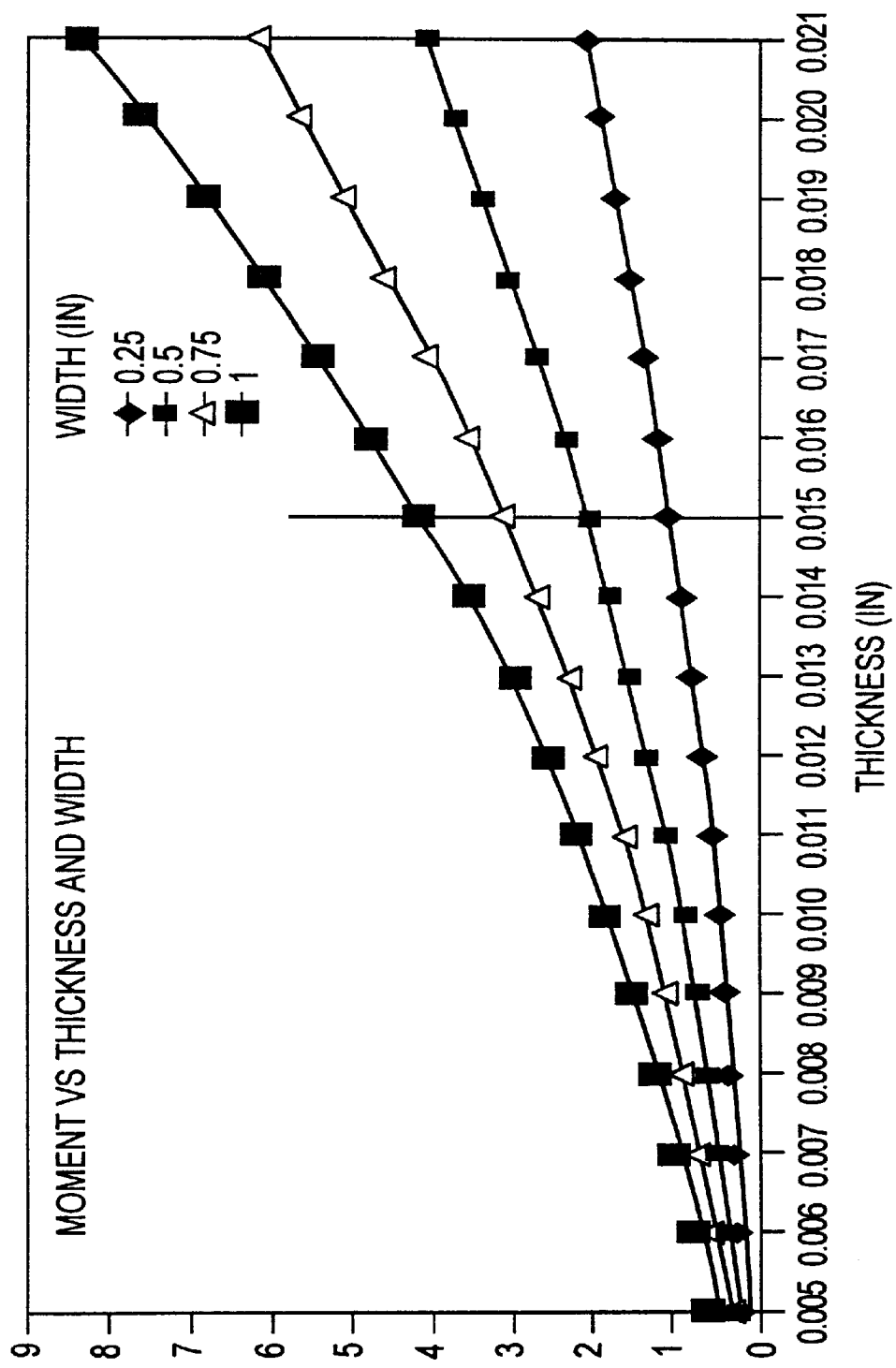
FIG. 7 is a graph depicting a family of curves for moment-thickness and width of shape memory alloy coils for use in actuators of the present invention.
Figure 8:
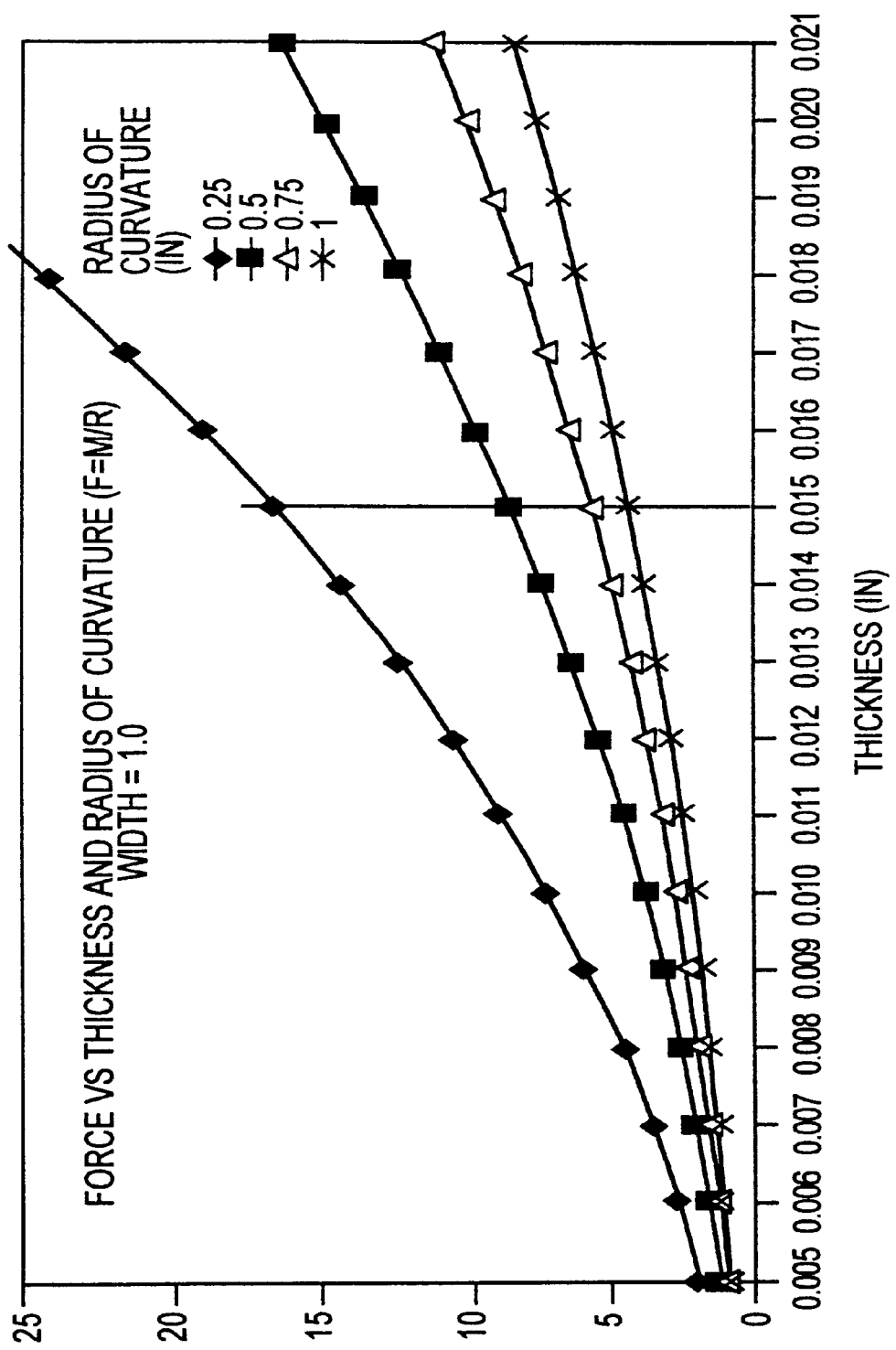
FIG. 8 is a graph depicting a family of curves for force-thickness and width of shape memory alloy coils for use in actuators of the present invention.
Figure 9:
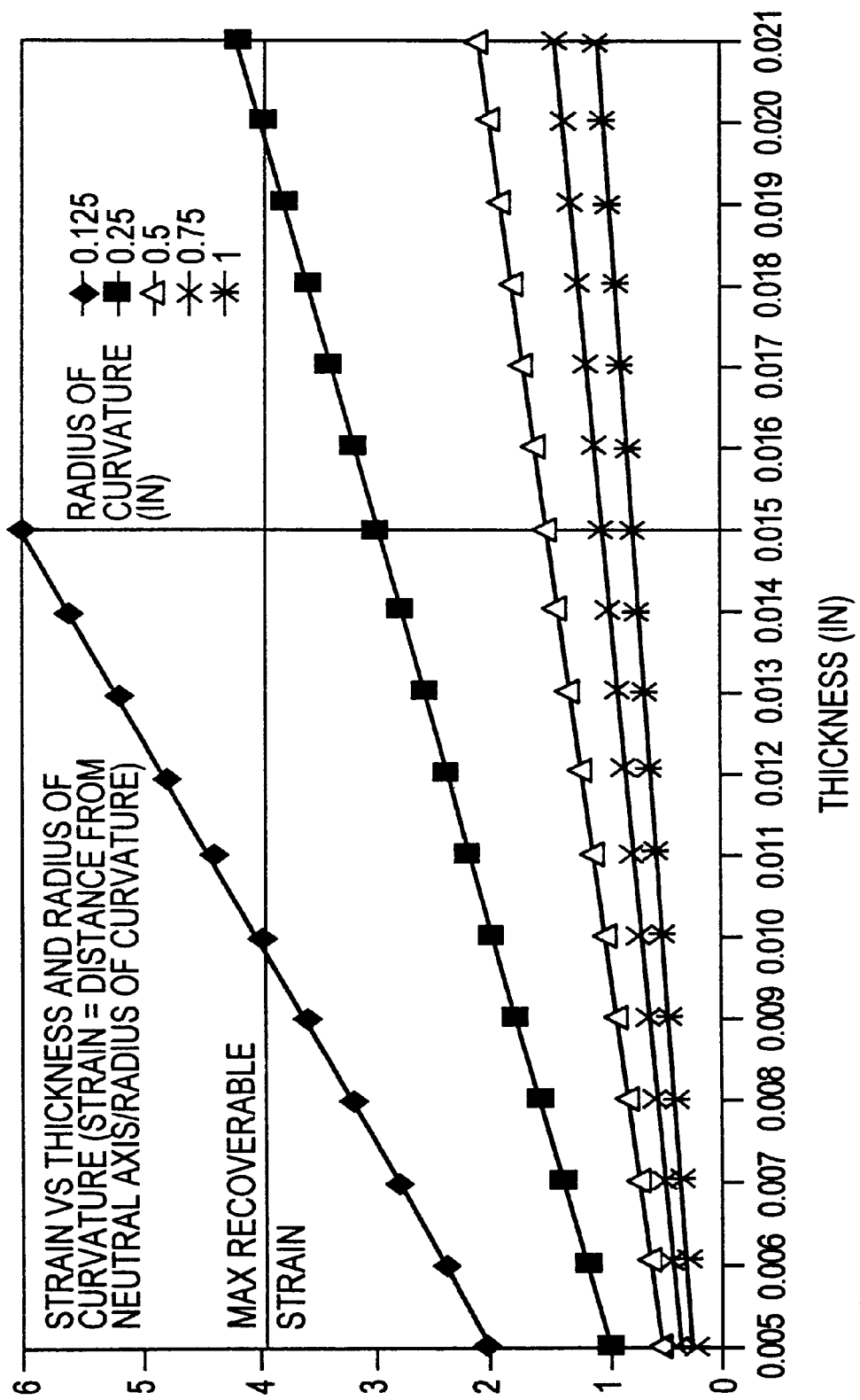
FIG. 9 is a graph depicting a family of curves for strain-thickness and radius of curvature of shape memory alloy coils for use in actuators of the present invention.

Of course, the width, thickness and radius of curvature of the shape memory alloy strip 124 may be varied in accordance with the particular requirements (e.g., stroke/distance the object is to be moved, and/or the force and/or moment needed to move the object) of the system. For example, for a strip 124 having a thickness of 0.015 inches, a width of 0.95 inches and a length of 14 inches, annealed flat, a stroke length of about 34 inches and an initial force of about 4 pounds was realized. FIGS. 7–9 illustrate estimated capabilities of shape memory alloy strips having various thicknesses, widths and/or radius of curvatures in relation to the moment, force and/or strain. In this regard, selection of the shape memory alloy strip may be optimized in accordance with the specific application (e.g., specific transition temperature range, force required to actuate the object to the desired location, repeatability (number of cycles the device will undergo)).

The foregoing description of the present invention has been presented for purposes of illustration and description. Furthermore, the description is not intended to limit the invention to the form disclosed herein. Consequently, variations and modifications commensurate with the above teachings and with the skill or knowledge of the relevant art are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An actuator for moving at least a first object from a first position to at least a second position linearly displaced from the first position, said actuator comprising:

a first rotatably-fixed member;

a coil comprising a strip of shape memory alloy wound about said first rotatably-fixed member, said strip having a first end portion interconnectable to said first rotatably-fixed member and a second end portion interconnectable to the first object; and means, engagable with said coil, for actuating said coil to at least translationally move the first object engagable with said second end portion of said coil from the first position to at least the second position.

2. An actuator, as claimed in claim 1, wherein said coil in a martensitic state corresponds to the first object in the first position and said coil in an austenitic state corresponds to the first object in the second position, wherein said means for actuating comprises:

means for heating at least a portion of said coil to transition said coil from said martensitic state to said austenitic state.

3. An actuator, as claimed in claim 2, wherein a first intermediate portion of said coil has a first radius of curvature in said martensitic state and a second radius of curvature greater than said first radius of curvature in said austenitic state.

4. An actuator, as claimed in claim 2, wherein said coil in said martensitic state is capable of applying a first force relative to the first object and said coil in said austenitic state is capable of applying a second force greater than said first force relative to the first object.

5. An actuator, as claimed in claim 4, wherein said first force is substantially equal to zero in said martensitic state and said second force is substantially constant in said austenitic state.

6. An actuator, as claimed in claim 1, wherein said means for actuating comprises:

a flexible heating element interconnectable to at least one of a first and a second surface of said coil; and an electric source for supplying current to said flexible heating element to resistively heat at least a portion of said coil from a first temperature corresponding to the first object in the first position to a second temperature corresponding to the first object in the second position, wherein said second temperature is greater than said first temperature.

7. An actuator for moving at least a first object from a first position to at least a second position, the second position being at least linearly displaced relative to the first position, said actuator comprising:

a first rotatably-fixed shaft;

a coil comprising a strip of shape memory alloy wound about said first rotatably-fixed shaft, said strip having a first end portion interconnectable to said first rotatably-fixed shaft;

means, interconnectable to the first object and engagable with a second end portion of said strip, for translating at least arcuate movement of said second end portion of said strip into at least linear movement of the first object from the first position; and means, engagable with said coil, for at least arcuately moving said second end portion of said strip from a first arcuate position to at least a second arcuate position relative to said first end portion of said strip to move at least the first object from the first position to at least the second position.

8. An actuator, as claimed in claim 7, wherein a first intermediate portion of said coil corresponding to said second end portion of said strip in said first arcuate position has a first radius of curvature and said first intermediate portion of said coil corresponding to said second end portion of said strip in said second arcuate position has a second radius of curvature greater than said first radius of curvature.

9. An actuator, as claimed in claim 7, wherein said means for at least arcuately moving comprises:

means for heating said strip from a first temperature to a second temperature, wherein said first temperature corresponds to a martensitic state of said strip and said second temperature corresponds to an austenitic state of said strip.

10. An actuator, as claimed in claim 9, wherein said means for at least arcuately moving further comprises:

means for regulating the amount of heat applied to said strip to vary the force applied to move the first object from the first position.

11. An actuator, as claimed in claim 7, wherein said means for translating comprises:

a translational member rotatable relative to said first rotatably-fixed shaft, wherein a first portion of said translational member is engagable with said second end portion of said strip, wherein said first portion of said translational member is rotatable with said second end portion of said strip as said second end portion of said strip moves from at least said first arcuate position to at least said second arcuate position.

12. An actuator, as claimed in claim 11, wherein said first portion of said translational member comprises a radially-oriented slot, wherein said means for translating further comprises:

an elongate member interconnectable to said second end portion of said strip and slidably engagable with said radially-oriented slot of said translational member.

13. An actuator, as claimed in claim 11, wherein said means for translating further comprises:

a tether member having first and second end portions, wherein said first end portion of said tether member is interconnectable to said translational member and said second end portion of said tether member is interconnectable to the first object.

14. An actuator, as claimed in claim 7, wherein said means for at least arcuately moving comprises:

means, interconnectable to said coil, for heating at least a portion of said coil from a first temperature corresponding to a martensitic state of at least said portion of said coil to a second temperature corresponding to an austenitic state of at least said portion of said coil.

15. An actuator, as claimed in claim 7, wherein said means for at least arcuately moving comprises:

at least a first flexible heating element in abutting contact with at least a portion of at least one of a first and second surface of said strip of shape memory alloy; and an electric source in electrical communication with at least said first flexible heating element for supplying electric current to at least said first flexible heating element to resistively heat at least said first flexible heating element, wherein heat from at least said first flexible heating element is at least conductively transferable to at least a portion of said coil to increase the temperature of at least said portion of said coil from a first temperature corresponding to a martensitic state of at least a portion of said coil to a second temperature corresponding to an austenitic state of at least said portion of said coil.

16. An actuator, as claimed in claim 7, further comprising:

a first flexible member having first and second end portions, wherein said first end portion of said first flexible member is interconnectable to said first rotatably-fixed shaft and said second end portion of said first flexible member is interconnectable to said first end portion of said coil.

17. An actuator, as claimed in claim 7, wherein a length of said strip remains substantially constant as said second end portion of said strip moves from said first arcuate position to said second arcuate position.

18. An actuator, as claimed in claim 7, wherein a first radius of said coil defined by a first radial distance between said second end portion of said strip at said first arcuate position is less than a second radius of said coil defined by a second radial distance between said second end portion of said strip at said second arcuate position.

* * * * *